Jan. 8, 1935. F. R. STEWART ET AL 1,987,423
REFRIGERATED CABINET
Filed July 11, 1932
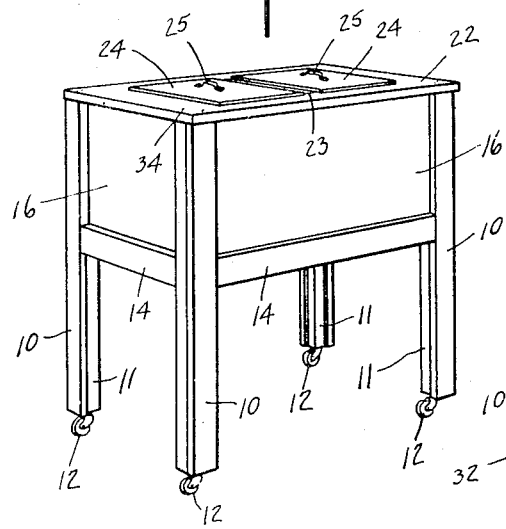
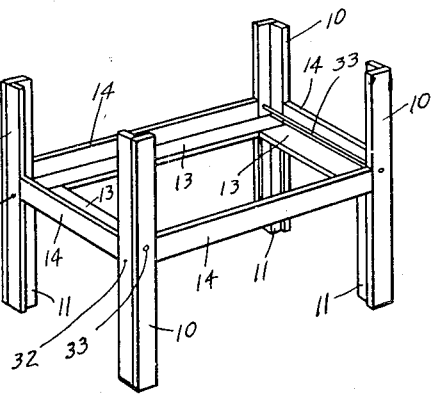
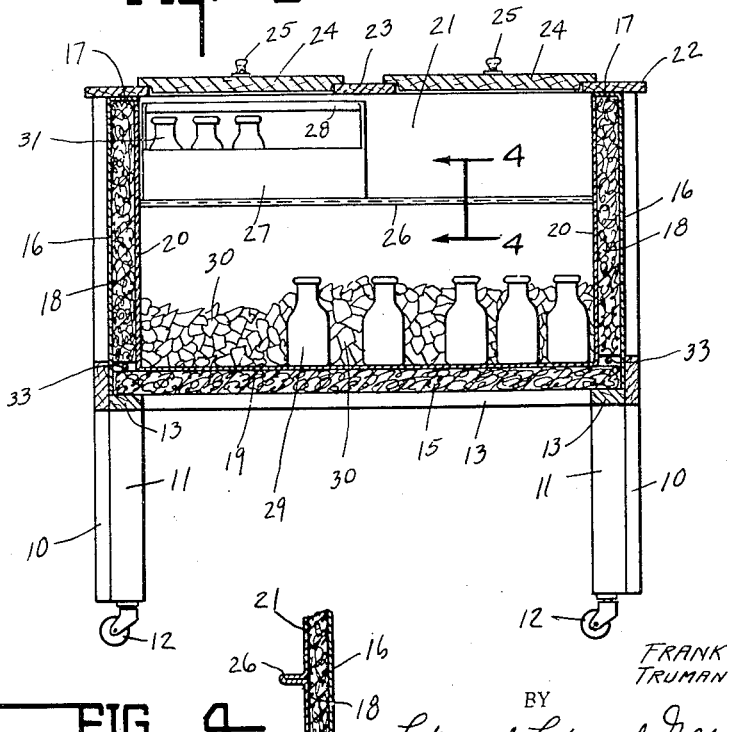
INVENTOR.
FRANK R. STEWART.
TRUMAN O. SPENCER.
BY
Lockwood Lockwood Goldsmith & Galt
ATTORNEYS.

Patented Jan. 8, 1935

1,987,423

UNITED STATES PATENT OFFICE 1,987,423

REFRIGERATED CABINET

Frank R. Stewart and Truman O. Spencer, Indianapolis, Ind., assignors to Hurty-Peck & Co., Indianapolis, Ind., a corporation Application July 11, 1932, Serial No. 621,884

2 Claims. (Cl. 220—9)

This invention relates to a refrigerated cabinet for bottled goods and is particularly adapted for use in the retail sales of milk and milk drinks direct to the consumers. It is also applicable to the sale of other cold bottled drinks.

The principal object of the invention is to provide a cabinet from which milk and other bottled drinks can be sold on a "serve-yourself" basis in grocery stores, delicatessen stores, roadside stands, golf courses, garages and other public and semi-public places. It has been found in practice that the serve-yourself principle has greatly increased the sale of milk for immediate consumption in many such locations and has initiated the sale of milk in factories, large offices and many other places where such sale has not before been possible. In the sale of milk under this system, especially in warm weather, the disposal of empty bottles is a problem. If empty milk bottles are allowed to accumulate in a haphazard manner, the residue of milk in the bottles soon sours with a resultant unpleasant odor and attraction of flies which discourages instead of encouraging further sale. In the present invention, provision is made for the storage of the empty bottles within the cabinet and access thereto is made simple and easy so that the customers themselves may be depended upon to return the bottles to the cabinet. The cabinet, therefore, provides for an increased sale of milk with little or no increase in the attendance of sales clerks or other employees.

Another object of the invention is to provide a light, strong and efficient refrigerator cabinet for all kinds of bottled soft drinks which can be easily shipped in the knocked-down condition and assembled by the purchaser.

Other objects and features of the invention will be understood from the accompanying drawing and the following description and claims:

Figure 1 is a perspective view of the cabinet complete. Figure 2 is a perspective view of the frame of the cabinet partially assembled. Figure 3 is a vertical sectional view through the entire cabinet and Figure 4 is a vertical sectional view taken on the line 4—4 of Figure 3.

The frame of the cabinet consists of four vertical corner members 10 having an L-shaped cross section, preferably formed of two pieces of hard wood, suitably secured together in the relation shown in Figure 2. Within the angle of each of the L-shaped members there is secured an additional vertical member 11 substantially square in cross section and extending from the bottom of the corresponding member 10 to a position at a convenient height above the ground for the bottom of the cabinet proper. Casters 12 are fitted to the lower ends of the vertical members 11. A horizontal rectangular frame consisting of horizontal members 13 rests upon the upper ends of the vertical members 11 and has secured thereto additional horizontal members 14. Each of the members 14 is located in the vertical plane of the adjacent vertical members 10. A rigid layer 15 of "celotex" or other insulation material rests upon the frame members 13. If desired, however, the said layer may be made non-rigid and may rest upon any suitable rigid support carried by the frame members 13. Side plates 16, preferably of sheet metal, are positioned with their vertical edges within the angles of the adjacent corner members 10 and with their lower edges hidden behind the horizontal members 14 and resting upon the frame members 13. The side plates 16 are formed with inwardly bent upper edges 17 each extending over a vertical layer 18 of insulation material positioned adjacent the inner surface of the corresponding side plate. A rectangular container, preferably of sheet metal and having bottom 19, end walls 20 and side walls 21, rests upon the insulation layer 15 and has its side and end walls adjacent the insulation layers 18. A rectangular open top frame 22 is secured to the upper end of the corner members 10. A removable cross bar 23 is carried by said frame and divides the opening therein into two parts, each closed by a cover 24 having a convenient handle 25.

Each of the inner walls 21 of the container is inwardly crimped at a position above the mid-point thereof to form a horizontal rib 26 extending substantially across the length of the container. A sliding tray 27 is supported upon the ribs 26 and is provided with a handle 28. The said tray has approximately half of the horizontal cross sectional area of the container proper and may be slid upon the ribs 26 from one end of the container to the other. Thus the tray 27 may be optionally positioned under either of the covers 24.

In the use of the cabinet, the full bottles of milk 29 are placed in the lower portion of the container and are surrounded with cracked ice 30. The tray 27 is placed at either end of the container and the cover 24 above the said tray is marked "Put empty bottles, straws and caps here." The other cover 24 is marked "Take full bottles here."

The cabinet is placed in a position readily accessible to customers and the customers are encouraged to help themselves to the full bottles and to replace the empties 31 in the tray 27. When the filled bottles have been exhausted from one side of the container, the tray 27 is slid to the opposite end thereof and the two covers 24 with their appropriate markings are reversed. When the tray 27 has been filled with empty bottles the covers 24 may be removed, permitting removal of the loose cross piece 23 and the tray 27. An empty tray may be placed therein or the empty bottles may be suitably disposed of and the tray replaced.

To facilitate the assembling of the cabinet by the purchaser, the corner members 10 and members 11 are assembled together at the factory and frame members 13 and 14 are also assembled together as is the top frame 22. All of these parts may be shipped in a relatively small carton together with the insulation material, side plates and the container proper. In the assembly by the purchaser, the frame 13 is placed in position upon the members 11 and secured thereto by screws 32, one for each corner member. A stay bolt 33 is then attached to each pair of corner members 10 to increase the rigidity of the structure. The insulation 15 and 18 is then put in position and is followed by the side walls 16 which are slipped into place between the insulation material and the corner members 10. The container proper is then positioned within the insulation material and the top frame 22 is secured to the corner members 10 by means of screws 34, two of which are provided at each corner. The cross piece 23 and covers 24 are then added and the casters 12 complete the assembly.

From the foregoing it will be evident that the refrigerated cabinet herein described provides a satisfactory solution for the problem of disposing of empty bottles which is one of the serious problems in the sale of milk or milk drinks for immediate consumption. The cabinet, when conspicuously placed in any public location where thirsty human beings may be found, greatly increases the sale and consumption of such drinks. This is especially true if suitable attractive advertising matter is displayed on the side walls 16 of the cabinet. It will also be seen that the cabinet is equally useful for the sale of other cold bottled drinks and that it is light, strong and durable and may easily be assembled from a knocked-down condition by a purchaser.

The invention claimed is:

1. In a refrigerated cabinet for bottled goods, the combination of four vertical corner members having L-shaped cross section, an additional vertical member secured in the angle of each of said L-shaped members and extending from the lower ends thereof to a point between their upper and lower ends, horizontal members forming a horizontal frame resting upon said last mentioned vertical members, a horizontal layer of insulation material rigidly supported upon said frame, vertical side plates of sheet metal having their vertical edges extending within the angles of said L-shaped corner members, and their lower edges supported by said horizontal frame, vertical layers of insulation material adjacent the inner surfaces of said side plates, a rectangular sheet metal container resting upon said horizontal insulation layer and having its side walls adjacent said vertical insulation layers, and a closure for the top of said container.

2. In a refrigerated cabinet for bottled goods, the combination of four vertical corner members having L-shaped cross section, an additional vertical member secured in the angle of each of said L-shaped members and extending from the lower ends thereof to a point between their upper and lower ends, horizontal members forming a horizontal frame resting upon said last mentioned vertical members, a horizontal layer of insulation material rigidly supported upon said frame, vertical side plates of sheet metal having their vertical edges extending within the angles of said L-shaped corner members, and their lower edges supported by said horizontal frame, vertical layers of insulation material adjacent the inner surfaces of said side plates, a rectangular sheet metal container resting upon said horizontal insulation layer and having its side walls adjacent said vertical insulation layers, a top frame resting upon the upper ends of said corner members, said top frame having an opening therein, and a closure for said opening.

FRANK R. STEWART.
TRUMAN O. SPENCER.